United States Patent [19]
Shah

[11] Patent Number: 5,212,781
[45] Date of Patent: May 18, 1993

[54] SECONDARY CACHE CONTROL FOR A COMPUTER SYSTEM

[75] Inventor: Ravi Shah, San Jose, Calif.

[73] Assignee: Chips and Technologies, Inc., San Jose, Calif.

[21] Appl. No.: 496,898

[22] Filed: Mar. 21, 1990

[51] Int. Cl.⁵ .............................................. G06F 13/00
[52] U.S. Cl. ..................................... 395/425; 395/550
[58] Field of Search ............... 395/250, 325, 425, 550, 395/164, 166, 800; 364/DIG. 1, DIG. 2

[56] References Cited

U.S. PATENT DOCUMENTS 5,058,006  10/1991  Durdan et al. ................. 395/425 X Primary Examiner—Robert L. Richardson
Attorney, Agent, or Firm—Joseph A. Sawyer, Jr.

[57] ABSTRACT

A secondary cache control system for a computer system is disclosed. The system is utilized advantageously to reduce the cost of the SRAM while not degrading the overall performance of the CPU associated with the computer. The system latches the data from the CPU until the CPU hits a "dead time". When this dead time occurs, the data is written into the SRAM. By writing to the SRAM at this time the performance of the computer system is not degraded and the cost of the SRAM is significantly reduced.

4 Claims, 2 Drawing Sheets

SECONDARY CACHE CONTROL FOR A COMPUTER SYSTEM

FIELD OF THE INVENTION

The present invention relates to a computer system and, more particularly, to the reading and writing of data to a cache within a computer system.

BACKGROUND OF THE INVENTION

As a processor technology develops, there has arisen a need for providing a reliable and fast way to write data into caches so as to allow for increased speed and performance of the total system. A typical processor performs two functions related to memory: it reads data from the memory, and writes data into the memory. There are several types of memories that processors utilize within a computer system: the main memory, dynamic random access memory (DRAM), and caches.

Retrieving information from the main disk memory generally takes the longest amount of time because hundreds of megabytes of information must be scanned to determine the location of information that was to be read or written. DRAMs are next in the amount of time required for access Although they are smaller than the main memory and therefore not so much information needs to be scanned for access, there are still four or more wait states required before the information can be accessed.

Hence, a cache is the memory that is utilized most often to access data to be utilized by the processor in the computer system. The problem with a cache, however, is that it is very small, usually hundreds of kilobytes of data; and therefore, there is a significant chance that instead of a "hit" during access, there will be a "miss" because the data required will not be available in the cache. What is done, then, is to write data from the main memory or the DRAM, as appropriate, into the cache so that the next time the data needs to be retrieved, it can be read from the cache by the processor.

However, in some processors, such as the Intel Corporation 486 processor, there is only a small window of time that a "write hit" can occur. What is meant by "write hit" is that time which is available to write data into the cache. In that particular processor, data can only be written into the cache during a 14 nanosecond (ns.) interval (49-63 ns.). That period of time is very small and will require a very fast static asynchronous Random access Memory (SRAM) or a synchronous SRAM to act as the cache. SRAMs of either of these types are expensive because oftentimes they must be smaller die size and the overall yields of SRAMS are very low. For example, the speed required to be able to directly access the memory during that 14 ns. hit period would require an SRAM that would be two to three times more expensive than the SRAM of average speed.

Hence, what is needed is a system in which the data can be written into a cache in a time interval that will allow the processor to read that information without inserting any wait states and also without requiring a fast SRAM. In addition, the system should not significantly add to the cost and complexity of the computer system.

SUMMARY OF THE INVENTION

The present invention comprises a secondary cache control system within a CPU, the CPU including a processor, a microcontrol unit and Static Random Access Memory (SRAM). The processor provides data and address signals to the SRAM. The memory control unit provides control signals to the SRAM. The secondary cache control system comprises a register means for receiving the data and address signals from the processor, a means for latching the data and address signals in the register means at a first predetermined time period, and means for causing the register means to send the data to the SRAM at a second predetermined time period. In so doing, there are not wait states inserted into the processor and, therefore, there is no degradation of performance.

DETAILED DESCRIPTION OF THE DRAWINGS

The present invention relates to an improvement in a computer system. The following description is presented to enable one of ordinary skill in the art to make and use the invention as provided in the context of a particular application and its requirement. Various modifications to the preferred embodiment will be readily apparent to those skilled in the art, and the generic principles defined herein may be applied to other embodiments. Thus, the present invention is not intended to be limited to the embodiment shown but is to be accorded the widest scope consistent with the principles and novel features disclosed herein.

Figure 1:
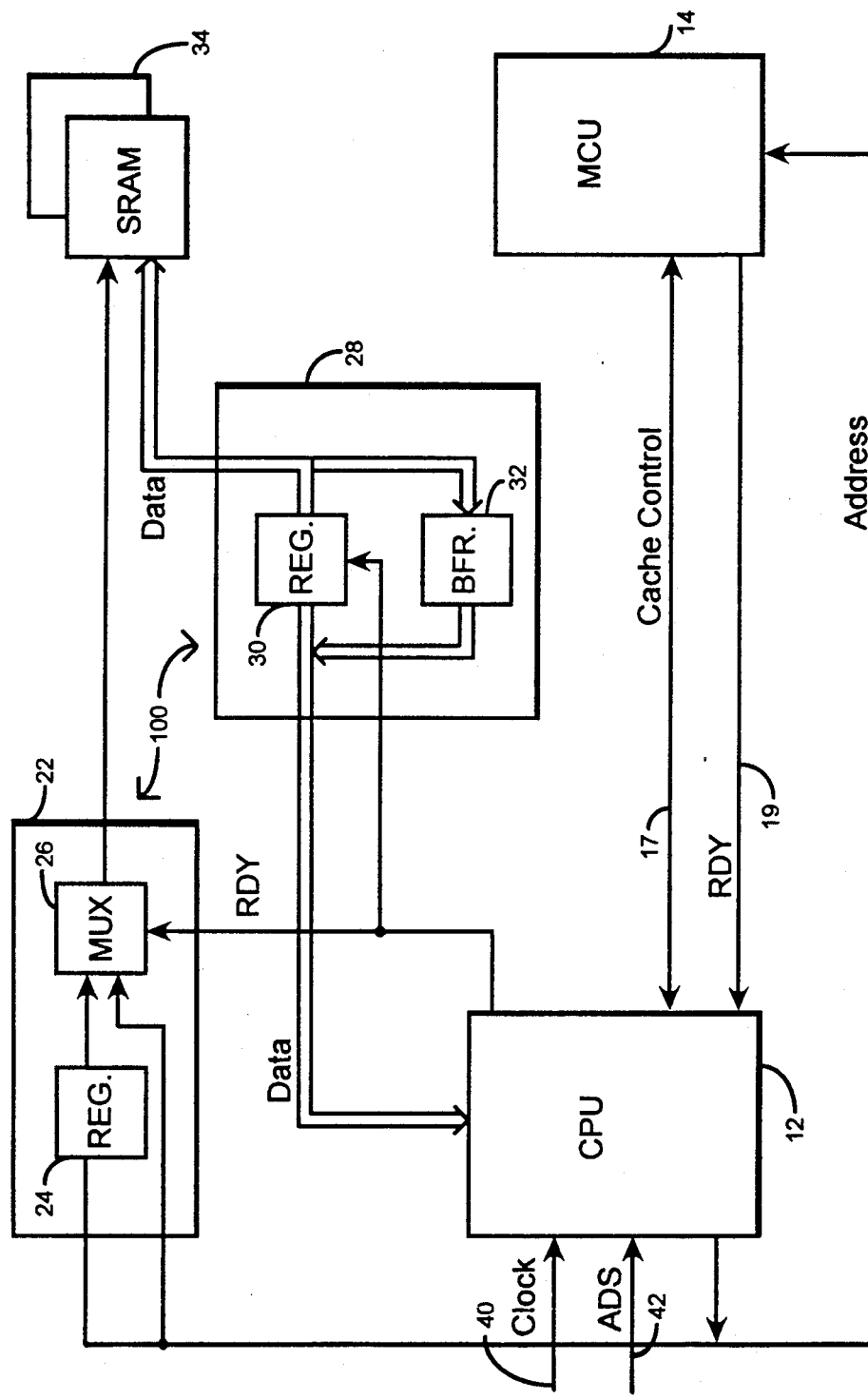
FIG. 1 is a block diagram of the in accordance with the present invention.

Referring now to FIG. 1, shown is a computer 10 including the secondary cache control system 100 of the present invention. The computer of the present invention comprises a central processing unit CPU 12, coupled to a memory control unit 14. The secondary cache control circuit 100 comprises register circuit 22 having a register 24 and multiplexor 26 which receives address signals from the CPU 12. Control circuit 100 further includes a register circuit 28 having a register 30 and buffer circuit 22, which can send and receive data to and from the CPU 12. SRAM 34 receives address signals from register circuit 22. The SRAM 34 also sends and receives data to CPU 12 via the register circuit 28.

The MCU 14 provides a cache control signal to the CPU 12 via line 17. There is also a "ready" (Rdy) signal via line 19 provided from the MCU 14 to CPU 12 to indicate that a read or write data transfer is completed. A clock signal is provided at periodic intervals via line 40. The address strobe (ADS) signal is provided via line 42 to the CPU 12. In a preferred embodiment, the CPU 12 is the Intel Corporation 80486 processor.

It is known that a CPU 12 like the 80486 processor needs very fast SRAMs for writing information when utilizing the cache there within. To more fully understand this, refer now to FIG. 2 in conjunction with the following paragraphs.

In the 80486 processor, typically the clock cycle is 30 ns. Hence, T1 is 0-30 nanoseconds; T2 is 30-60 ns.; T3 is 60-90 ns., etc. Halfway through T1 at 15 nanoseconds the ADS signal is active. The data is then written into register 22 49 to 63 ns. after the clock cycle is initiated. A very fast SRAM would be required if the "write hit" is provided directly.

The CPU 12 puts the data on data lines at 14 nanoseconds. If the data is not provided the SRAM during that time interval, wait cycles must be to hold the data on the lines. Therefore, the use of average speed SRAMS could significantly affect the performance of the computer system. It is well known to one of ordinary skill in the art that these wait cycles will degrade the performance of the CPU 12.

However, if fast SRAMs are utilized, there is a significant cost penalty. For example, a fast SRAM can be two to three times more expensive than an average speed SRAM. This cost penalty can be significant, particularly in the personal computer market. Therefore, since both performance and cost are affected, the present invention provides a solution that overcomes these problems.

Figure 2:
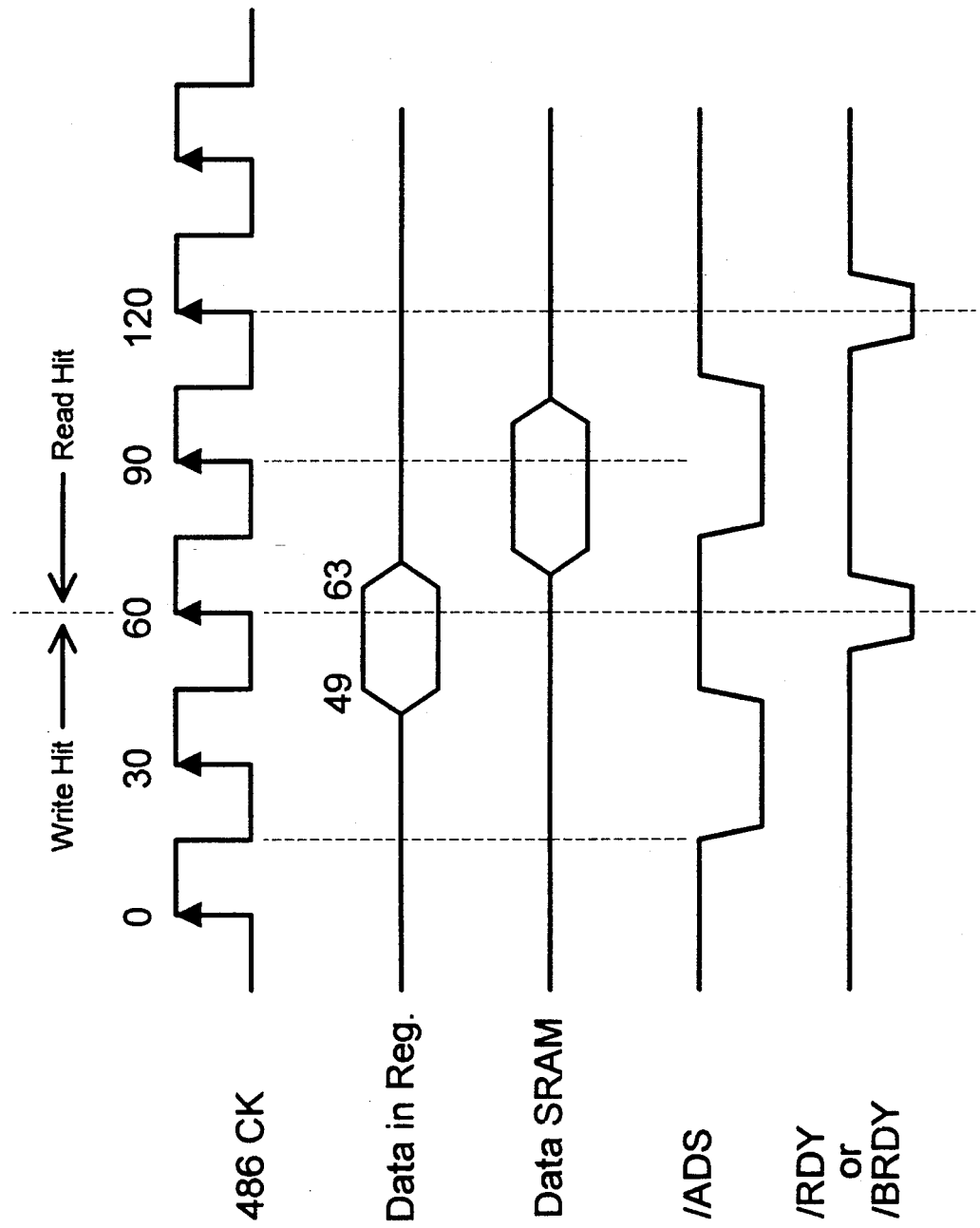
FIG. 2 is a timing diagram of the various signals in the system in accordance with FIG. 1.

The present invention comprises the secondary cache control circuit 100. Referring back to FIG. 1, the secondary cache control circuit comprises latching the address signals in register circuit 22 and latching data in register circuit 28 during the 14 ns. internal that data is on the line. The data and address information are held in the registers 22 and 28 until 90 nanoseconds have elapsed. The present invention takes advantage of the condition that between 60-90 nanoseconds, there is a dead time for the processor. At 90 ns the data can be written into the SRAM (FIG. 2). Hence, there is no need for a fast SRAM and there is no degradation of performance of the CPU 12 because the dead time of the processor is being utilized.

Therefore, the present invention provides a secondary cache control that decreases the cost of the SRAMs without affecting the performance of the processor.

It is understood that the above-described embodiment is merely illustrative of but a small number of the many possible specific embodiments which can represent applications of the principles of the present invention. Numerous and various other arrangements can be readily devised in accordance with these principles by one of ordinary skill in the art without departing from the spirit and scope of the present invention. The scope of the present invention is limited only by the following claims:

What is claimed is:

1. In a computer including a central processing unit (CPU), a Memory Control Unit (MCU) coupled to the CPU, and a Static Random Access Memory (SRAM) for receiving data from and sending data to the CPU, a system for providing secondary cache control for the CPU comprising:
   means for latching data and address signals from the CPU during a first predetermined time period;
   and means for writing data into the SRAM during a second predetermined time period in which the CPU is not operating on data.

2. In a computer including a Central Processing Unit (CPU), a Memory Control Unit (MCU) coupled to the CPU and a Static Random Access Memory (SRAM) for receiving and sending data to the CPU, a system for providing secondary cache control for the CPU comprising:
   first circuit means having a first register and a buffer for receiving data signals from and sending data signals to the CPU and to the SRAM;
   second circuit means having a second register and a multiplexer for receiving address signals from the CPU and sending address signals to the SRAM;
   means for latching data and address signals from the CPU between 49 and 63 ns. after the clock cycle is initiated; and
   means for writing data into the SRAM between 60 and 90 ns. after the clock cycle is initiated.

3. The system according to claim 1 wherein the means for latching data from the CPU during the first predetermined time period comprises a first register means for receiving data signals from the CPU and the SRAM.

4. The system according to claim 3 wherein the latching means further comprises a second register means for receiving address signals from the CPU.

* * * * *